(12) United States Patent
Smith (10) Patent No.: US 6,419,418 B1
(45) Date of Patent: Jul. 16, 2002

(54) APPARATUS AND METHOD FOR SPREADING MATERIAL

(76) Inventor: Francis V. Smith, P.O. Box 3487, Bozeman, MT (US) 59772

( * ) Notice: Subject to any disclaimer, the term of this patent is extended or adjusted under 35 U.S.C. 154(b) by 0 days.

(21) Appl. No.: 09/690,988

(22) Filed: Oct. 18, 2000

Related U.S. Application Data (60) Provisional application No. 60/160,763, filed on Oct. 21, 1999.

(51) Int. Cl.[7] .............................. B60P 1/00; B60P 1/56
(52) U.S. Cl. ..................... 404/101; 239/656; 239/676; 239/667; 239/668
(58) Field of Search ................................ 404/101, 108, 404/109, 110; 239/653, 656, 657, 668, 682, 676, 667

(56) References Cited

U.S. PATENT DOCUMENTS

| | | | | |
|---|---|---|---|---|
| 2,594,084 A | * | 4/1952 | Skibbe et al. | 239/654 |
| 3,235,268 A | * | 2/1966 | McLean | 239/654 |
| 3,652,019 A | * | 3/1972 | van der Lely | 239/682 |
| 3,884,395 A | * | 5/1975 | Keenan | 404/108 |
| 3,931,934 A | * | 1/1976 | Smith | 239/657 |
| 3,997,277 A | * | 12/1976 | Swisher, Jr. et al. | 404/84 |
| 4,108,010 A | * | 8/1978 | Taylor et al. | 74/100 R |
| 4,141,591 A | * | 2/1979 | Spicer | 298/17.6 |
| 4,175,705 A | * | 11/1979 | Dreyer | 239/651 |
| 4,188,152 A | * | 2/1980 | Kitt | 404/110 |
| 4,568,028 A | * | 2/1986 | Verseef et al. | 239/657 |
| 4,607,979 A | * | 8/1986 | Morrison | 404/110 |
| 4,657,431 A | * | 4/1987 | Morrison | 404/110 |
| 4,757,918 A | * | 7/1988 | Ottewell | 404/110 |
| 4,836,456 A | * | 6/1989 | van der Lely | 239/682 |
| 4,852,949 A | * | 8/1989 | Quinn et al. | 303/100 |
| 5,004,163 A | * | 4/1991 | van der Lely et al. | 239/682 |
| 5,234,128 A | * | 8/1993 | Hill | 404/110 |
| 5,387,051 A | * | 2/1995 | Valente | 404/101 |
| 5,405,214 A | * | 4/1995 | Campbell | 404/110 |
| 5,599,135 A | * | 2/1997 | Delaurenti | 404/101 |
| 5,863,149 A | * | 1/1999 | Gustin | 404/101 |
| 6,027,052 A | * | 2/2000 | Strieker et al. | 239/654 |
| 6,149,079 A | * | 11/2000 | Kinkead et al. | 239/668 |
| 6,161,986 A | * | 12/2000 | Smith et al. | 404/75 |

FOREIGN PATENT DOCUMENTS

GB         2071046 A   *   1/1981  ............. B60P/1/00

* cited by examiner

*Primary Examiner*—Robert E. Pezzuto
*Assistant Examiner*—Alexander K. Pechhold
(74) *Attorney, Agent, or Firm*—Clark & Brody (57) ABSTRACT

A spreading apparatus utilizes a number of features to improve material discharge and apparatus maintenance. In one embodiment, the apparatus uses a diverter in the box receiving the material for discharge that directs the material along a converging path and then a non-converging path to avoid material bridging and feed stoppages. The apparatus also employs a double tipping mechanism and a gate assembly, which arranges the gates in the plane of the box floor for improved dumping. The gate opening can have a grid to further control material discharge. The spreader device receiving the discharged material can employ one rotatable disc or double rotatable discs for spreading and a deflector plate directing the material to the discs. The box can be configured to utilize a number of different removable chutes, the removable chutes configured to handle a specific type of material for spreading. A particular chute can be selected to match the material intended for spreading.

21 Claims, 8 Drawing Sheets

APPARATUS AND METHOD FOR SPREADING MATERIAL

This application claims priority under 35 U.S.C. §119(e) based on provisional patent application No. 60/160,763 filed Oct. 21, 1999.

FIELD OF THE INVENTION

The present invention is directed to an apparatus for spreading material, and in particular to a spreader vehicle that employs features such as double tipping, a parallel slope box floor configuration for improved material flow, a gate assembly providing enhanced material discharge from the box, a disc feed deflector that eliminates chute blockage design, a double disc spreader assembly, deflector plates providing easier maintenance and reduced material jamming, and removable chutes as part of the box for enhanced flexibility in carrying and spreading materials.

BACKGROUND ART

In the prior art, double tipping vehicles are well known. U.S. Pat. No. 4,141,591 is one example of such a vehicle.

Figure 1:
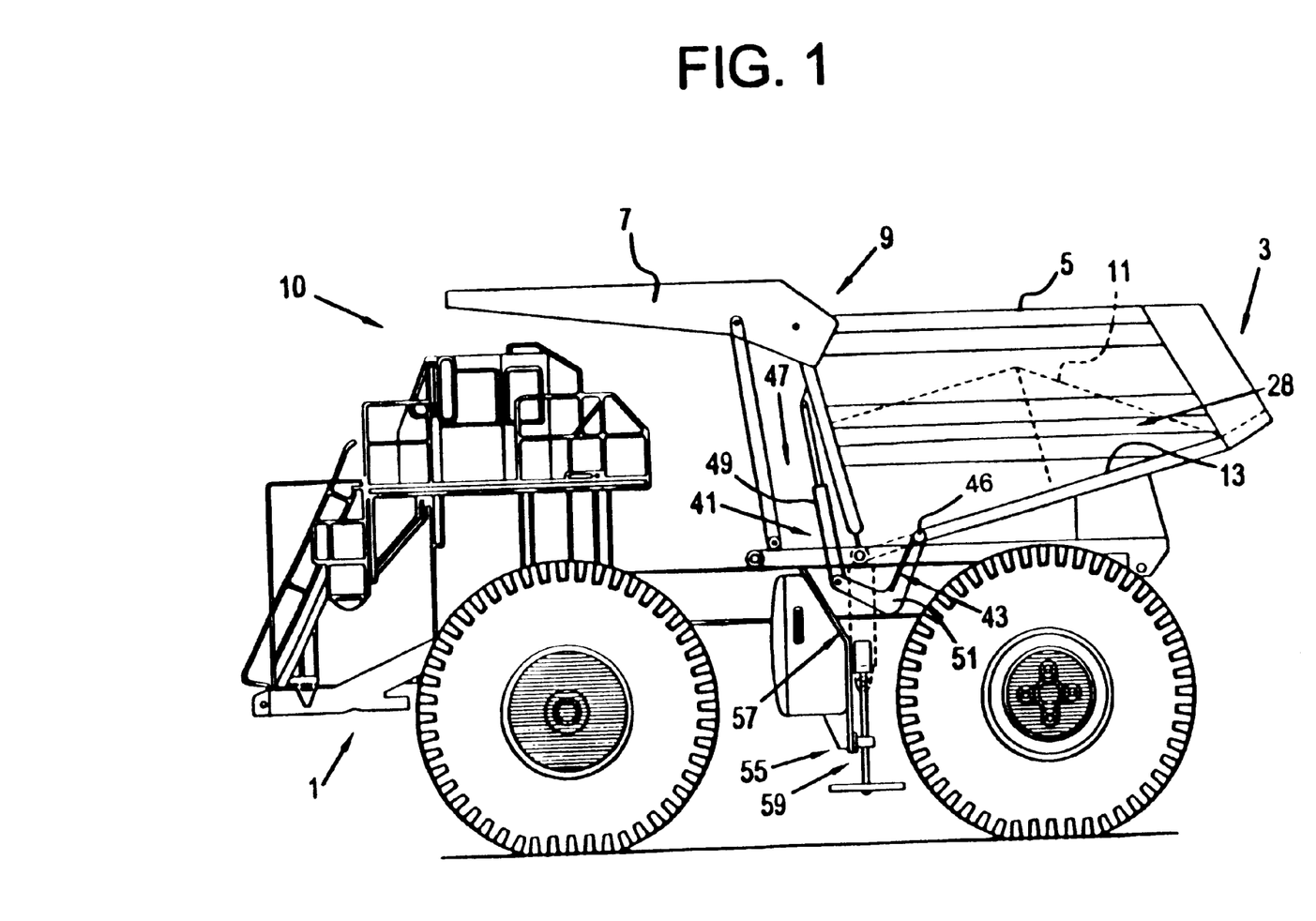
FIG. 1 is a side view of one embodiment of the invention showing the gate in the open position.

Spreader vehicles are also known as exemplified in Smith's U.S. Pat. No. 3,931,934. FIG. 1 of the Smith patent depicts a vehicle with a box that is forward tipping only to direct material onto spreader discs arranged in front of the vehicle drive wheels. Smith uses a sliding plate to control the discharge of the material from the box. With this design, the material discharged from the box supplies traction for the wheels when driving conditions may be hazardous. This patent is hereby incorporated in its entirety by reference.

The spreader vehicle of Smith is not without its disadvantages however. With the Smith box design, feed blockages often occur, thus interrupting spreading of material on a roadway or leaving a boxload of material that cannot be emptied. Feed blockages are often caused by the state of the material in the box. With ideal material, i.e., material of the proper size and moisture content, blockages do not generally occur. However, the material is many times oversized or in the form of lumps and crusts as a result of freezing. This oversized material then blocks the gates of the box or does not flow properly. If the material is inadequately prepared, it can compact in the box and cannot be discharged easily. Mixing of the material with snow may also lead to discharge problems. Further, the sliding plate design of Smith tends to be oriented in a level or horizontal position when forward tipping occurs, such an orientation not conducive to easy flow of material.

Another problem in prior art designs is the difficulty in spreading materials of different sizes and consistencies using a single box configuration. For instance, materials that are coarser may distribute and flow differently than materials that may be more slurry-like such as sludge.

As such, a need has developed to provide an improved spreader apparatus, particularly, for off-highway use. A need also exists to accommodate different types of materials for spreading with the same apparatus. In response to these needs, the present invention provides an improved spreader apparatus and method of spreading that overcomes the deficiencies in the prior art design.

SUMMARY OF THE INVENTION

Accordingly, it is a first object of the present invention to provide an improved spreading apparatus.

Another object of the present invention is a spreading apparatus that minimizes problems in material discharge.

A still further object of the present invention is a method of spreading material using one or more features of the inventive apparatus for improved material discharge.

One other object of the present invention is an apparatus that can be installed on an existing vehicle or manufactured as part of a new vehicle.

Yet another object of the invention is an apparatus and method of spreading material wherein the apparatus is used in an off-highway application, e.g., roadways that are used in the mining industry and the like.

One further object of the invention is a method of spreading material and an apparatus therefore that utilizes a box having removable chutes for material discharge. One or a pair of chutes is configured to facilitate the spreading of a desired charge of material.

Other objects and advantages of the present invention will become apparent as a description thereof proceeds.

In satisfaction of the foregoing objects and advantages, the present invention, in one embodiment, is an improvement over prior art spreader apparatus such as disclosed in the Smith patent noted above.

The Smith prior art spreader is equipped with a forward-only tipping box having a box floor and a diverter arranged on the box floor. The diverter forms a funnel-shaped travel path to a pair of openings. The material discharge is controlled by gates adjacent the openings. Once exiting the openings, the material enters a chute and falls onto a rotating disc for spreading.

In one embodiment of the invention, the box is both forward tipping and rearward tipping. The box may have a tailgate on a rearward end for rearward tipping, if desired.

In another embodiment, the diverter of the box is sectioned into two portions, one shaped like the prior art design and a second portion providing a travel path which allows for easier flow of material to the gate openings. The second section employs a pair of plates positioned forward of the termination the first diverter portion, the plates inclined towards each other and forming a travel path that is generally the same in cross sectional area for the length of the plates. In this way, the funneling of prior art design is avoided and material can more easily flow toward the gate openings. In a preferred embodiment the floor width in the second portion is about 6 feet wide, but other widths can be used.

Another feature of the invention is that the gates are each hinged to pivotally open rather than slide open as in the prior art. The gate is aligned generally with the plane of the box floor to enhance material discharge. Further, the gate has a grid or series of plates attached thereto, the plates channeling the material to the spreader discs as the material flows out the gate opening an along the gate. Although plates are shown, other grid configurations could be employed to channel the material as it exits the gates.

In yet another embodiment, deflector plates are arranged beneath and adjacent the gates. The deflector plates replace the prior art chutes and minimize jamming as well as provide for easier access to the spreading assembly components for maintenance. The deflector plates extend transversely of the vehicle length and track the width of the gate for material channeling. Using the grid on the gates with the deflector plates enhances the material discharge from the box.

Another embodiment of the invention includes using at least a pair of rotatable discs beneath the deflector plates. A pair of discs allows for wider gate openings. Further, the gate and grid configuration permits a wider flow of material exiting the box and the ability to use more than one disc. Using at least a pair of discs allows for changes in disc rotation directions and speeds and a greater variety of distribution patterns.

The forward tipping box also employs a cab guard, which pivots with forward tipping. The cab guard then both protects the cab during the spreading operation as well as during box loading.

In another embodiment, the invention entails a vehicle spreader box assembly for on off-road vehicle comprising a box body adapted to be mounted to an off-road truck, the box body having opposing sides, a floor, and a forward wall. The floor further comprises a diverter extending upwardly from the floor to form a pair of material flow paths between the diverter and each opposing side of the box. Each material flow path terminates in an opening in the box floor. The box body includes a pair of chutes, each chute having an inlet, a converging wall structure forming another material flow path, and an outlet of defined width. Each inlet is adapted to removably attach to a respective box floor opening.

Each chute includes a gate assembly, each gate assembly having a gate sized to cover the chute outlet. The gate is pivotal between a closed position and an open position, opening of the gate allowing material to be discharged from the box body.

The spreader box can be mounted on an off-road truck having a truck body. The truck body has one or more spreader devices positioned beneath each chute outlet for distribution of material in the box body.

A deflector plate can be positioned downstream of each gate of the removable chutes, and each gate can include a plurality of plates downstream of the gate to vertically channel material exiting each gate.

The off-road truck spreader vehicle can comprises a rear tipping mechanism adapted to tip the box body rearward, and/or a front tipping mechanism adapted to tip the box body forward. When using the front tipping mechanism, a pivotal cab guard is provided extending forward of a front end of the box body, the cab guard shielding a cab of the vehicle in the forward tipped position and a horizontal box body position.

The diverter and the opposing sides can form either a pair of converging material flow paths to each box floor opening, or material flow paths, wherein each path has a converging portion and a non-converging portion.

The vehicle spreader box assembly is adapted to employ a plurality of pairs of chutes, each pair having unique configurations to accommodate a particular type of material for spreading.

This embodiment also involves using the spreader vehicle features to efficiently spread materials of different sizes and consistencies. The method involves loading the material desired for spreading and discharging it by gate operation and, if desired box tipping. The removable chutes are selected based on the material to be discharged. After one spreading task, the chutes can be replaced with differently-sized chutes to spread a different material.

BRIEF DESCRIPTION OF THE DRAWINGS

Reference is now made to the drawings of the invention wherein.

DESCRIPTION OF THE PREFERRED EMBODIMENTS

The present invention offers significant improvements over prior art spreader vehicles in terms of material discharge and spreading, and maintenance of the vehicle and its components.

The inventive apparatus employs a number of features, which contribute to the improvements over the prior art. One, all of, or a select number of these features can be utilized as part of the apparatus, either as a retrofit of an existing vehicle or as part of a newly manufactured one.

The invention in terms of both method and apparatus is preferably geared towards vehicles and uses for off-highway use as opposed to use on conventional and regulated roadways.

The embodiment depicted in FIGS. 1–6 involves a spreading vehicle apparatus having a forward tipping box, a pair of gate assemblies, and a spreader assembly for each gate assembly positioned forward of drive wheels of the vehicle.

The apparatus can also include a rearward tipping mechanism to tip the box in a rearward direction, and deflector plates arranged adjacent the gates to deflect material exiting the box onto the spreader assembly. Each gate assembly may have a gate lying in a plane generally coincident with the box floor, and a grid thereon with plates to channel material from a gate opening to the spreader assembly. The apparatus can also include a pivotal cab guard extending forward of a front end of the box, the cab guard shielding a cab of the vehicle, both in the forward tipped position and a horizontal box position. The box can include a diverter arranged in the box made up of two sections, a first converging section and a second non-converging section.

The embodiment of FIGS. 1–6 also entails a method of spreading material using the spreader vehicle having a forward tipping box comprising the steps of loading the vehicle with material to be spread, tipping the material towards a front end of the vehicle, and discharging the material through the pivotally opening gates and onto the spreader assembly. Depending on the features of the apparatus being employed, the discharging may utilize: (1) channeling the material between a converging and then a non-converging travel path in the box; (2) discharging the material along channels adjacent the gates; and (3) discharging the material along deflector plates downstream of the gates.

Figure 2:
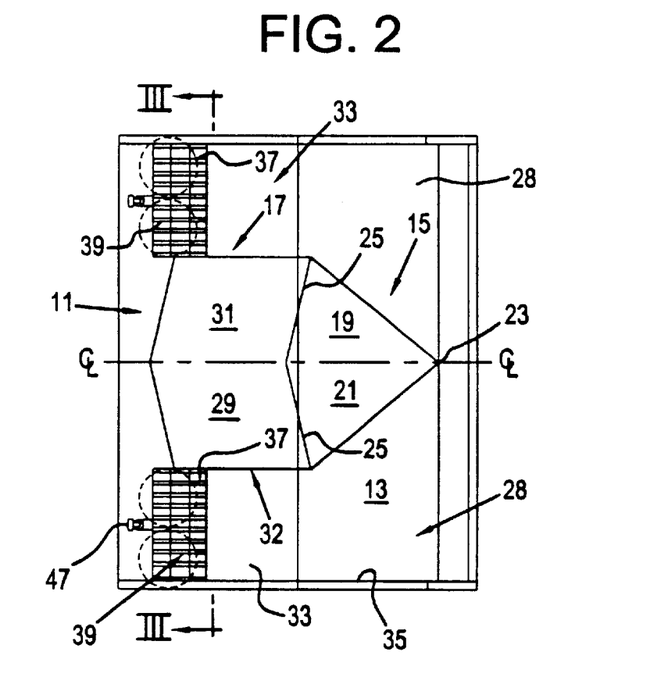
FIG. 2 is a top view of the box of FIG. 1.

Referring to FIGS. 1 and 2, one embodiment of the invention is generally depicted by the reference numeral 10 and includes a vehicle 1 and a box and spreader assembly 3. The vehicle 1 is an off-highway vehicle, one that is not designed to travel on roads used by commercial vehicles and passenger cars. The box and spreader assembly includes a box 5, the box 5 including a moveable cab guard 7 extending from a box forward end 9, and a diverter 11 arranged on the box floor 13.

The diverter 11 has two parts, a converging portion or section 15 and a non-converging section or portion 17. The converging section 15 is similar to that used in the Smith patent in that the two plates extend from start point 23 to end lines 25 to form a path of material travel 27 which is funnel-like.

In contrast to the Smith diverter design, the non-converging section 17 has two plates 29 and 31, each forming a path of material travel 33, which is non-converging, or as a path which has a generally constant cross section. The intersection line 30 of the plates 29 and 31 and the floor 13 forms a line which is generally parallel to the sidewall 35 of the box 5. With this non-converging path of travel 33, the bridging that often occurs in spreaders using a funnel-shaped path is eliminated or at least greatly minimized.

The path of travel 33 terminates at an opening 37. The width of the opening 37 is increased as a result of the non-converging path 33, thereby contributing to improved material flow through the opening for subsequent spreading.

Disposed beneath the openings 37 are a pair of gate assemblies 41. Each assembly 41 has a gate 43 which pivots between a closed position wherein the gate 43 is generally in the same plane as the box floor 13 and an open position as shown in FIG. 1. The gate 43 pivots about point 46 and is driven by a hydraulic mechanism or equivalent thereto 47, including a hydraulic cylinder 49 linked to the gate 43 by arm 51.

Figure 3:
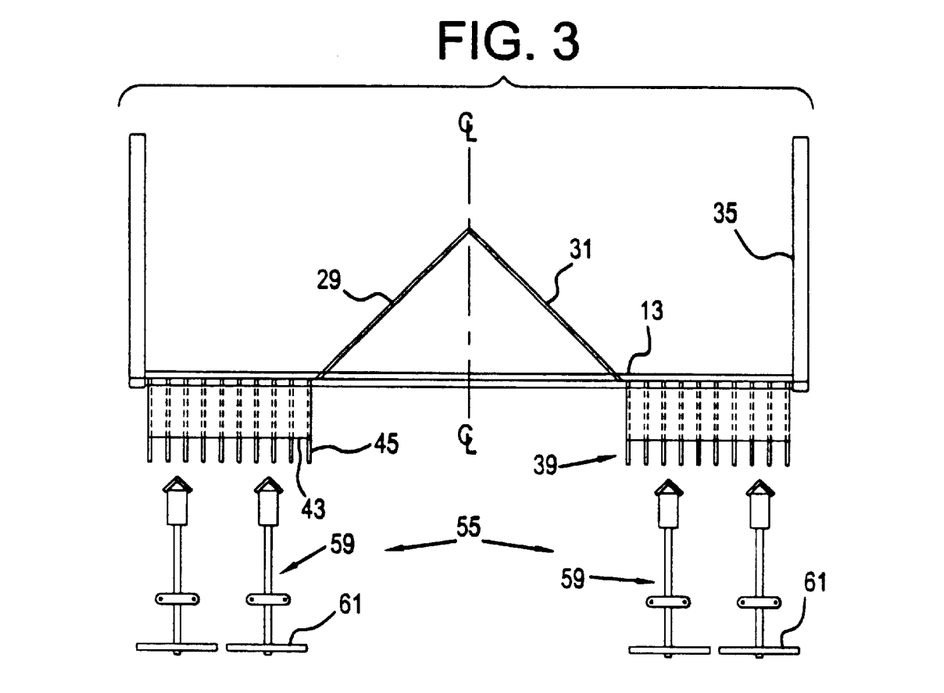
FIG. 3 is a sectional view along the line III—III of FIG. 1.

Referring to FIG. 3, the gate 43 has the grid 39 comprised of a series of plates or dividers 45 attached thereto. The plates 45 segregate or channel the material as it exits the opening 37 for even flow.

Referring now to FIGS. 1 and 3, a spreading assembly 55 is disposed beneath the gate assemblies 41 to distribute the material forward of the drive wheels of the vehicle. Each spreader assembly includes a deflector plate 57 and a pair of rotatable discs 59 assemblies with discs 61. The plates 45 of the grid 39 assist in guiding the material along the deflector plate 57, thereby eliminating the need for a chute as in prior art designs, and chute jamming. Having a pair of rotating discs 61 allows for variation in the direction of disc rotation for flexibility in distributing the material exiting the box. For example, one disc could rotate in one direction and the other disc could rotate in the opposite direction for enhanced spreading. Using double discs also permits the utilization of a wider gate 43 for improved material discharge.

Figure 4:
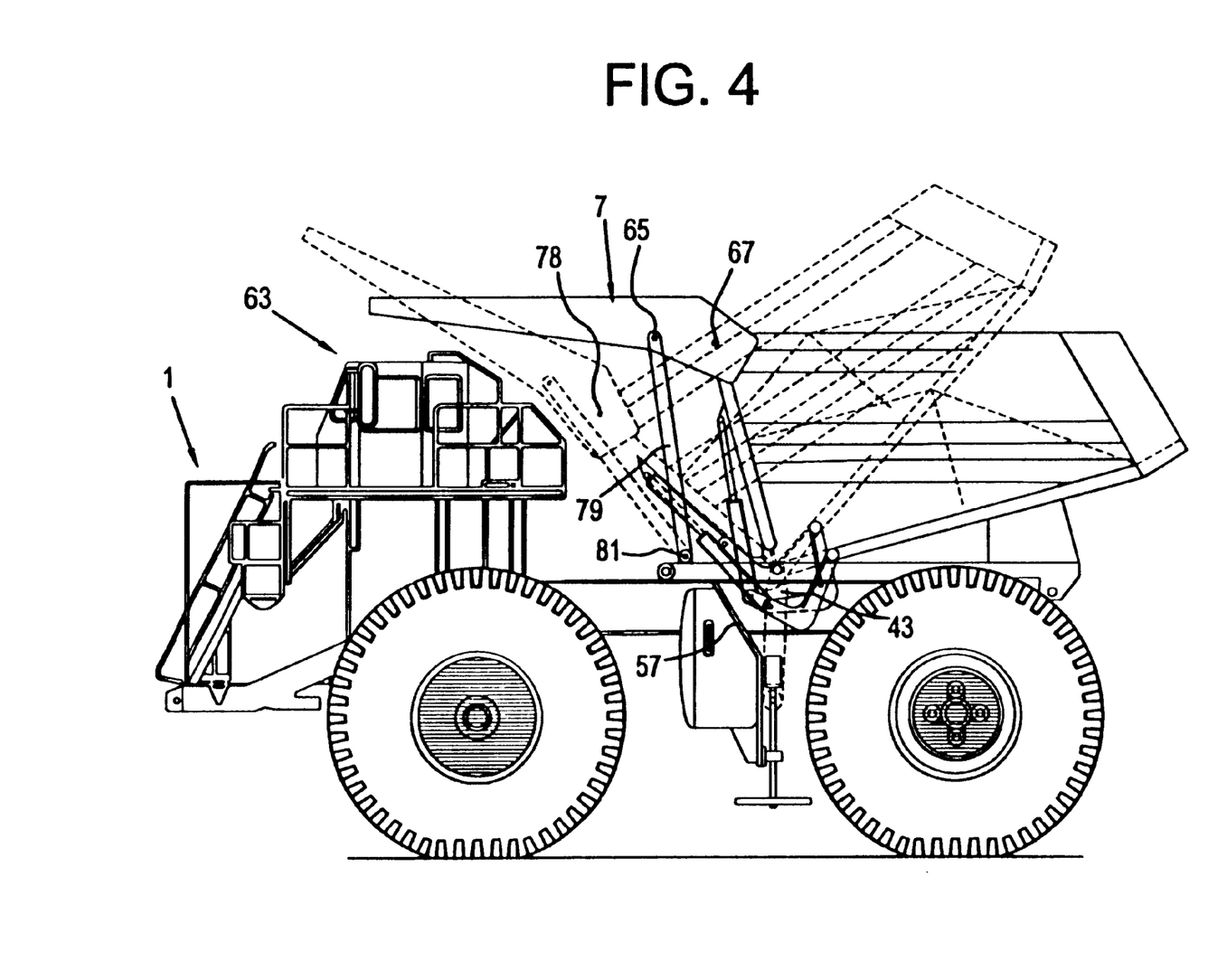
FIG. 4 is a side view of the FIG. 1 embodiment with the box in the forward tipping position.

In operation, the box is first loaded with material for spreading. The box is then tipped forward as shown in FIG. 4. With the forward tipping, the gate 43 is opened to allow material to travel along paths 28 and 33, see FIG. 1, through the openings 37, past the plates 45 of the grid 39, against the deflector plates, and onto the rotating discs 61 for spreading.

During forward tipping, see FIG. 4, the cab guard 7 pivots to protect the cab 63 of the vehicle. The guard 7 is pivotally attached at points 65 and 67 to the box 5 and support member 79, respectively. When the box 5 forward tips, the guard 7 pivots on 67 with respect to the box 5, and the pivot point 67 translates to position 78 during forward tipping. At the same time, the guard 7 pivots about point 65, and the support member 79 pivots about fixed point 81, the support member 79 maintaining the guard 7 away from the cab 63. Upon returning the box to its horizontal position, the cab guard 7 pivots back to protect the cab 63 when the box 5 is being loaded. A hydraulic mechanism is employed for forward tipping although not shown. Since these mechanisms are known in the art, a further description thereof is not deemed necessary for understanding of the invention. Of course, other forward tipping mechanisms can be used with the invention.

Figure 5:
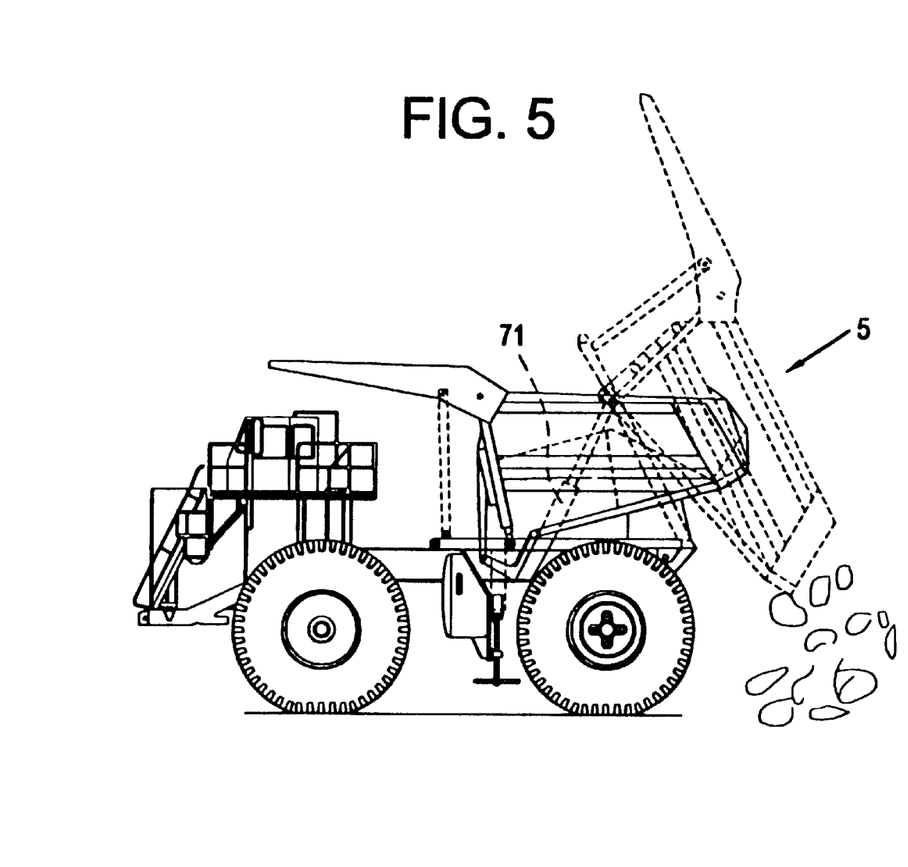
FIG. 5 is a side views of the FIG. 1 embodiment with the box in the rearward tipping position.

FIG. 5 exemplifies the rearward tipping feature of the invention. A hydraulic mechanism 71 is provided to direct the box 5 rearward for tipping. The rear tipping accomplishes a multitude of purposes. First, any debris on the cab guard 7 can be removed by rearward tipping. When tipped rearward, the box can be easily cleaned out and a bad load, e.g., one that is improperly sized, has snow mixed in with it and the like, can be easily removed.

Figure 6:
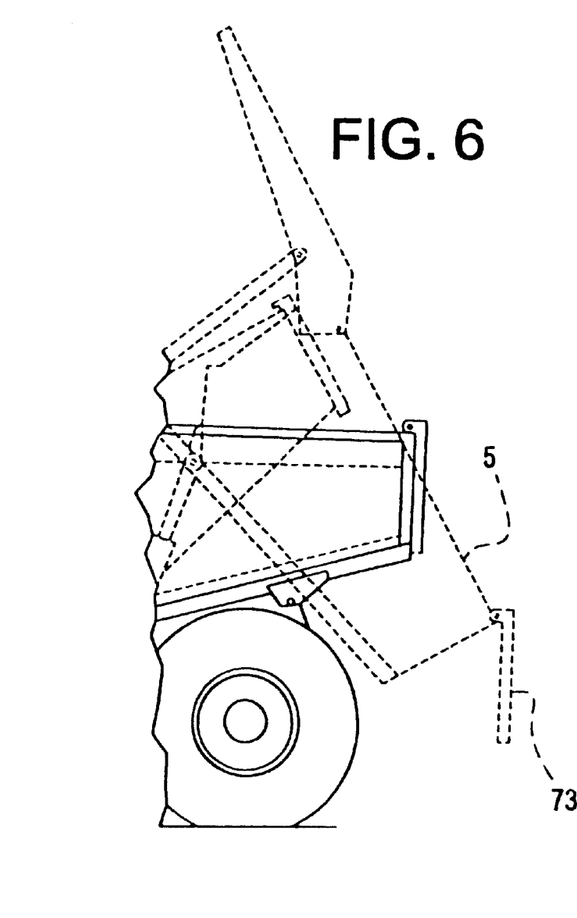
FIG. 6 shows a partial side view of another embodiment employing a tailgate on the box.

As part of the rearward tipping feature, the box can have a tailgate 73 as shown in FIG. 6.

Figures 7A, 7B:
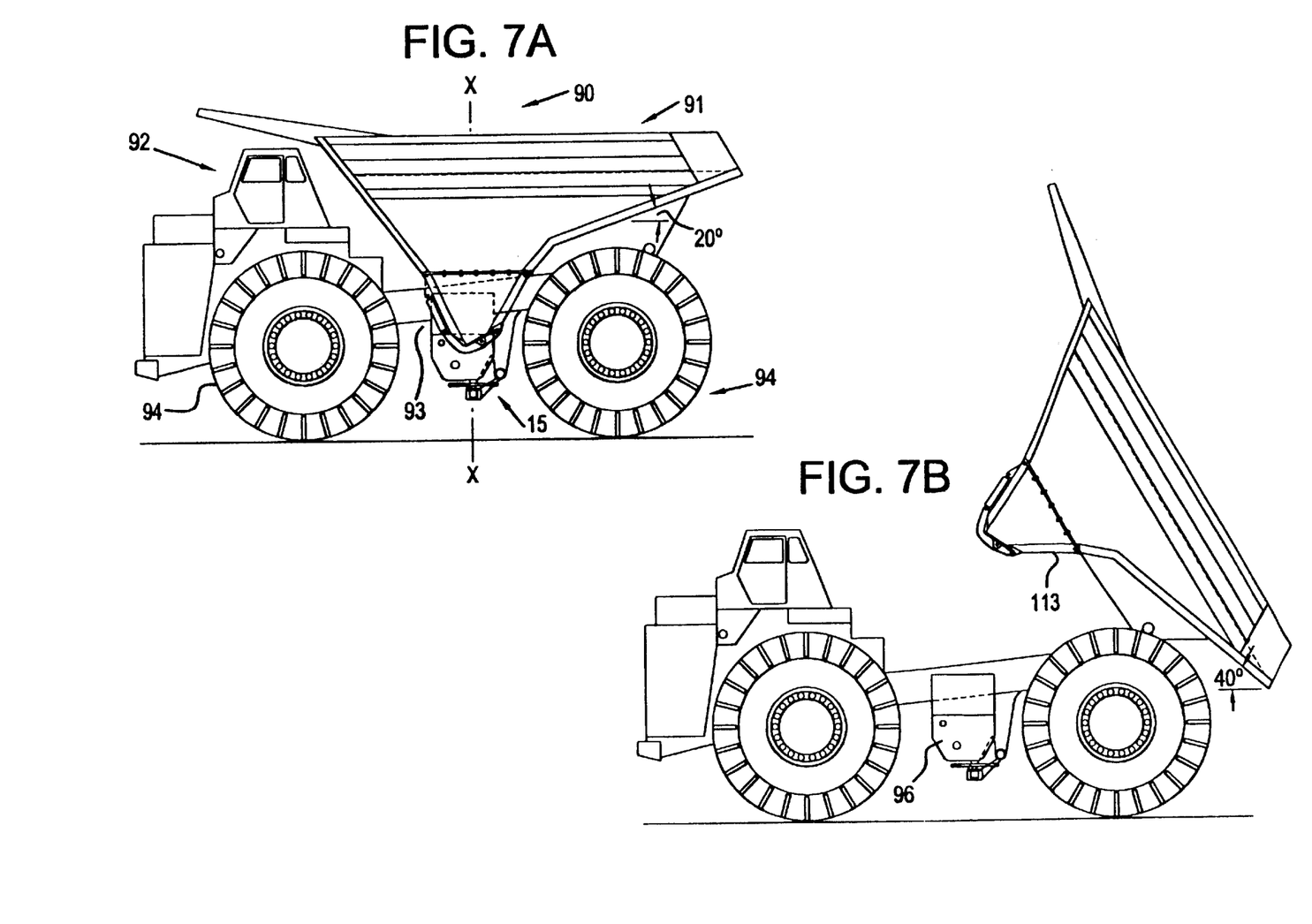
FIGS. 7A and 7B show side view of an alternative box configuration mounted on a truck for rear tipping.

FIGS. 7A–11 illustrate another embodiment of the invention wherein the box of the spreading vehicle has removable chutes in conjunction with the gate assembly. Referring to FIGS. 7A and 7B, a spreader vehicle is designated by the reference numeral 90. The vehicle 90 has a box assembly 91 mounted for rear tipping on the vehicle 90. The vehicle 90 is a conventional truck, i.e., CAT 793B, and has a front cab 92, truck body 93, and wheels 94. A spreader assembly is supported by the truck body 93 and is depicted by reference numeral 95.

FIG. 7B shows the box assembly 91 in the rear tipped position for emptying contents of the box body 98 of the box assembly 91. As with FIGS. 5 and 6, the rear tipping mechanism is conventional and does not need further description for understanding of the invention. The components 96 supported by the body 93 are part of the lifting mechanism for the conventional truck depicted in FIGS. 7A and 7B. The box assembly 91 is FIG. 7B is shown without a tailgate, but one can be employed if so desired, see 73 in FIG. 6.

Figure 8:
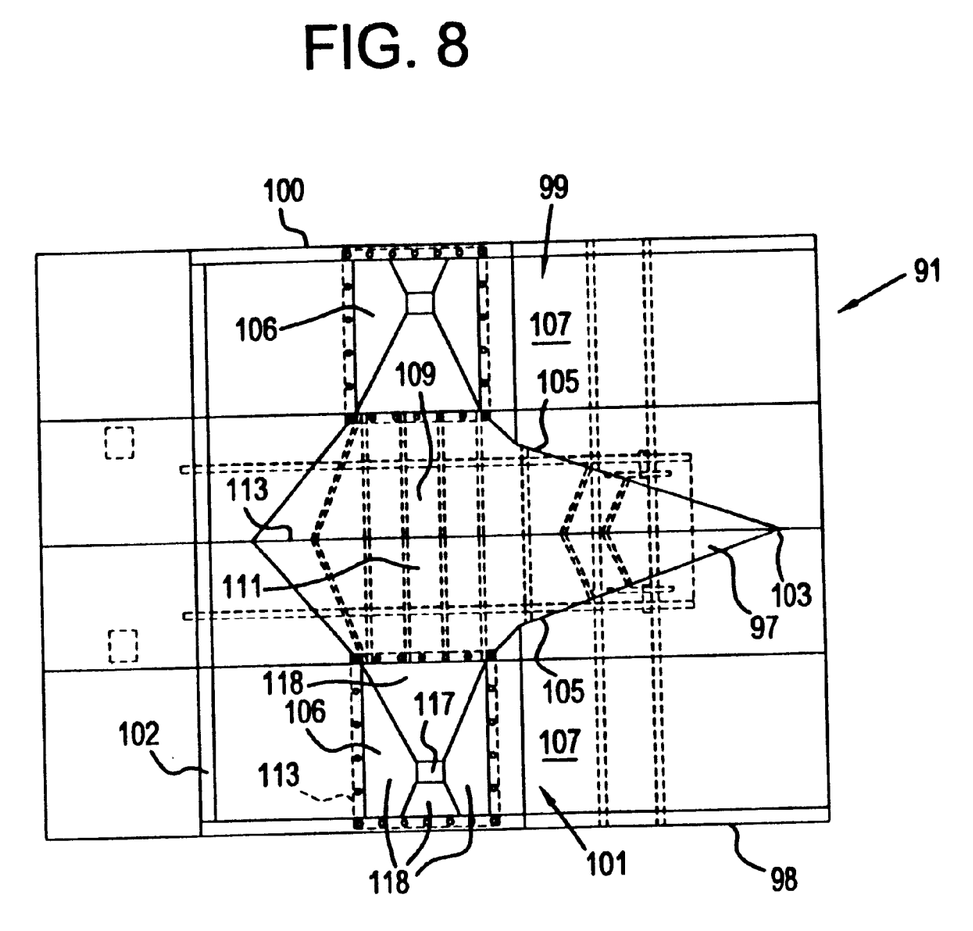
FIG. 8 is a top view of the box of FIGS. 7A and 7B.

Referring to FIG. 8, the box body 98 has a diverter 97, similar to the diverter shown in FIG. 2. In addition, the box body 98 has opposing sidewalls 100, a forward wall 102, and a box floor 107. The diverter 97 separates the box body 98 into two flow paths 99 and 101, and the flow paths are generally converging in shape from the diverter end 103, along the edge 105 where the diverter 97 meets the box floor 107, and to box floor openings 106. This contrasts with the converging and non-converging design of the box of FIG. 2. However, it should be understood that the diverter 97 could be modified to match the FIG. 2 shape is so desired.

The diverter has sides 109 and 111 which terminate in an upper ridge 113, the sides 109 and 111 directing the material towards the box gates to be described hereinafter.

The box assembly 91 differs from the box of FIG. 2 by the presence of a pair of removable chutes 113. Each chute is removably attachable to the box body 98 by fasteners, e.g., nuts and bolts, or any other means allowing the chutes 113 to be removed for repair, cleaning, or installation of a chute of alternate shape. To facilitate attachment, each chute has a flange 114 that mates with a complementary flange 116 on the box body 98.

Figures 9, 10:
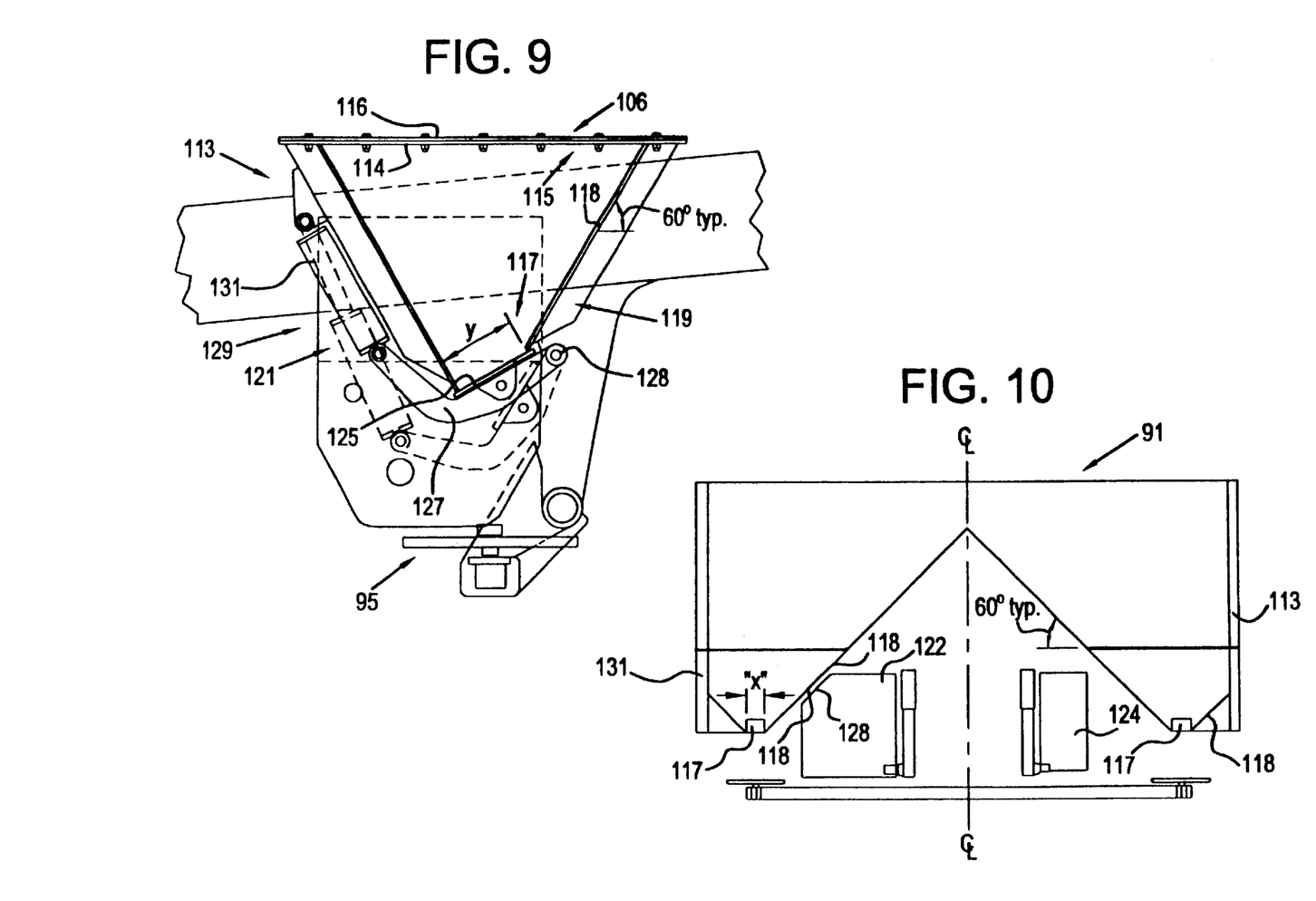
FIG. 9 is an enlarged side view of one gate assembly of the box of FIG. 8.
FIG. 10 is a sectional view taken along the line X—X of FIG. 7A.

Referring now to FIGS. 8 and 9, the chute 113 has an inlet 115 and an outlet 117. Each chute has a converging wall configuration 119, which interconnects the inlet 115 to the outlet 117. FIG. 8 shows the wall configuration with four sidewalls 118, each sloping and converging to the outlet 117.

Each chute has a gate assembly 121 similar to the gate assembly of FIG. 4. The assembly 121 has a gate 125 sized to cover the outlet 115. The gate 125 is pivotal between an open and a closed position by movement of the arm 127 and hydraulic cylinder 129. When the piston 131 of the cylinder 129 is extended, the arm 127 pivots about 128, and the gate 125 is opened for material discharge onto the spreader device 95. The gate assembly 121 differs from the earlier described gate in that gate 125 is more parallel to the chute wall 118 when open, see FIG. 9, whereas the gate of 43 of FIG. 4 is more parallel to the box floor when closed.

FIG. 10 more clearly depicts the pyramidal shape of the chutes 113 as formed by the walls 118. However, it should be understood that the shape of the wall configuration, the inlet 115 and the outlet 117 can vary to accommodate different materials for discharge and spreading. For example, the width "X" of the outlet 117 could have a width of 12 inches, thus causing the walls 118 in FIG. 10 to have a relatively modest angle, e.g., 45°. Alternatively, the width could be 40 inches or more, thereby increasing the angle of the walls 118 of FIG. 10 to be closer to vertical. With a wide dimension "X", a double spreader could be employed for material distribution.

Referring to FIG. 9, the sidewalls 118 are sloped at a 60° angle, thus forming a gate dimension "Y". If the width "X" changes, but dimension "Y" does not change, the angulation of walls in FIG. 9 may remain the same.

FIG. 10 also shows the fuel tank 122 and the hydraulic tank 124, each a part of the truck itself. The fuel tank 122 is slightly modified by angling the corner 128 to accommodate the side 118 of the chute 113. Similar modifications could be made to the hydraulic tank 124 for chutes with larger width dimensions.

The outlet 117, although depicted as being generally square in FIG. 8, could be rectangular, circular, ovate or the like, and have varying dimensions for each shape. As mentioned above, the width "X" could vary from inches to feet. Likewise, the chute inlet 115 and box opening 106 could have another shape. The shape of the inlet 115 and opening 106 should generally coincide to allow for easy attachment of the chute 113 to the box assembly 91.

To accommodate different materials, a first set of chutes could be sized to spread sand and would have a specific outlet size. A second set of chutes would be sized to spread another material such as sludge. Each chute would have the same inlet size to mate with the opening 106 of the box body 98, but the chute pairs would have different outlet configurations to handle different materials.

The chute appropriate for the material to be spread would then be attached to the box body 98, and the spreading operation would commence. In spreading, the box would be filled with the desired material, and the gates 125 would be opened for discharge of material onto the spreader devices 95. The spreading can be done with the box body in the horizontal position, or in the forward tipped position, or in sequence, first horizontal, then forward tipped.

In addition, for a given pair, one chute configuration could vary from the other chute if need be. For example, it may be desirable to spread more material on one side of the truck than the other side. A smaller chute would be attached to one of the box floor openings for discharge onto a single spreader, and larger opening chute could be attached to the other box floor opening to feed a double spreader. Other variations can be employed as would be within the skill of the art.

Figure 11:
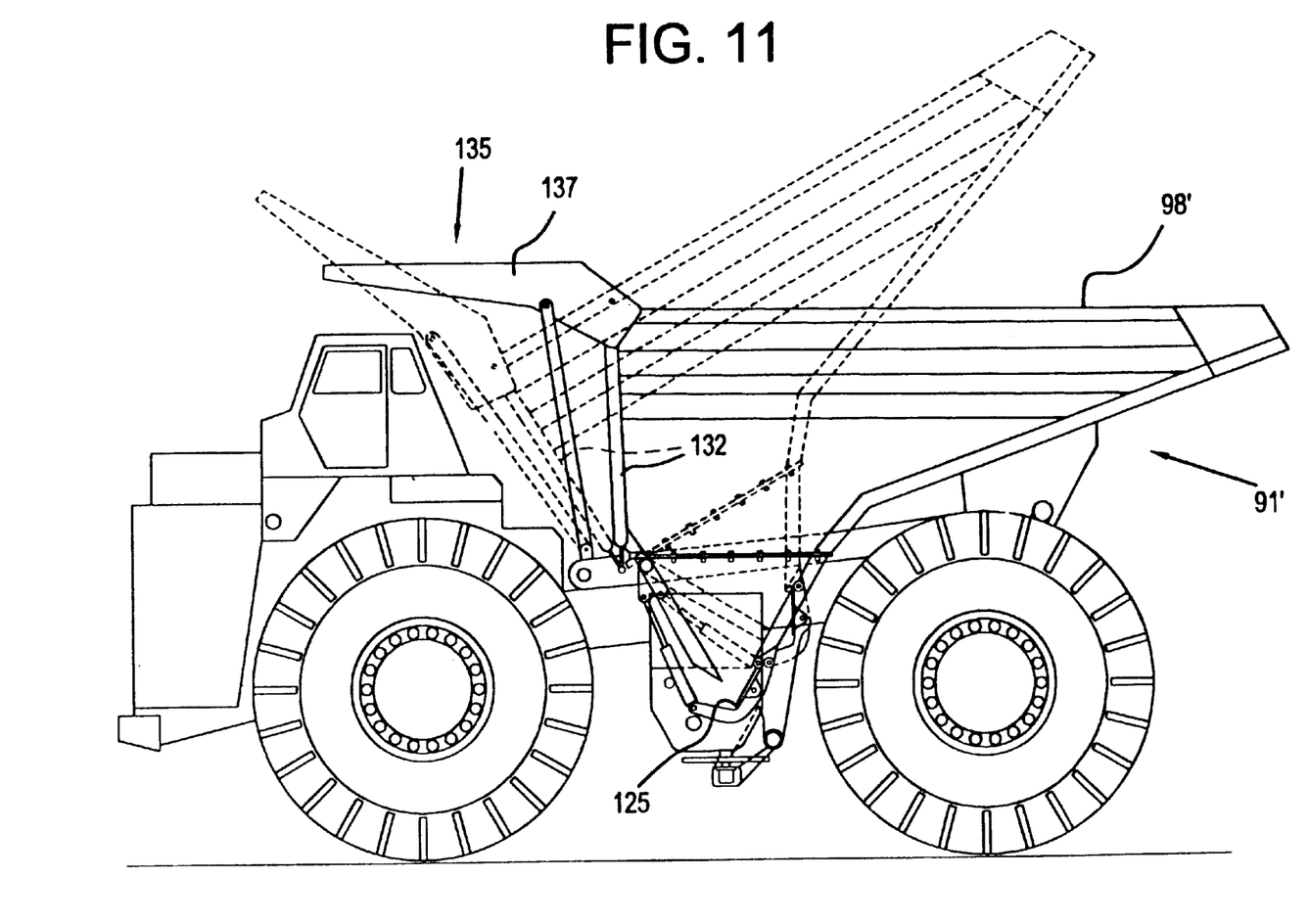
FIG. 11 is a side view of a forward tipping variation of the FIG. 7A embodiment, showing the box in the up and down position and one gate open.

The box assembly 91 could be used in a stationary manner where the truck would not tip the box. Alternatively, it could be used with a rear tipping mechanism as in FIG. 7B. In another alternative, the box assembly 91 could be modified to allow for forward tipping. Referring now to FIG. 11, a box assembly 91' has a modified forward wall 132 and a cab guard assembly 135 to allow for forward tipping. The assembly 135 has the same components as the forward tipping mechanism shown in FIGS. 1 and 4, and operates in the same way; the cab guard 137 pivots upwardly during forward tipping so that the cab guard 137 does not strike the truck cab. FIG. 11 shows the box assembly 91' in the down position, with the up position shown in phantom. In each position, the gate 125 is open. With the gate 125 open and the box assembly 91' in the forward tipped position, the angle of material discharge is essentially vertical, thus facilitating material flow into the chute 113 and onto the spreader device 95. Using the chute and forward tipping reduces the likelihood of material hang-up in the box body.

The embodiment shown in FIGS. 7A–11 can be utilized with any or all of the compatible features shown in FIGS. 1–6. For example, the deflector plates 57 and channeling plates or dividers 45 can be employed in combination with the gate assembly 121. Likewise, the diverter of FIG. 2 could be used in the box body 98, and the diverter 97 of FIG. 8 could be used in the box 5 of FIG. 1. Single or dual spreaders can be used with either box 5 or box assembly 91.

Although a particular type of truck is shown for use with the inventive box assembly, any off-road truck could be utilized with the box, including ones that have rearward tipping mechanisms, frontward tipping mechanisms, both rearward and frontward tipping mechanisms, and even trucks wherein the box assembly would be stationary or non-tipping.

As such, an invention has been disclosed in terms of preferred embodiments thereof which fulfills each and every one of the objects of the present invention as set forth above and provides new and improved apparatus for spreading material and a method of material spreading using the inventive apparatus.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. A vehicle spreader box assembly for on off-road vehicle comprising:
  a) a box body adapted to be mounted to an off-road truck, the box body having opposing sides, a floor, and a forward wall, the floor further comprising a diverter extending upwardly from the floor to form a pair of material flow paths between the diverter and each opposing side, each material flow path terminating in an opening in the box floor;
  b) a pair of chutes, each chute having an inlet, a converging wall structure forming another material flow path, and an outlet of defined width, each inlet being removably attachable to a respective box floor opening; and
  c) a gate assembly mounted to each chute, each gate assembly having a gate sized to cover the chute outlet, the gate being pivotally moveable between a closed position and an open position, opening of the gate allowing material to be discharged from the box body.

2. The vehicle spreader box assembly of claim 1, wherein the diverter and the opposing sides form a pair of converging material flow paths to each box floor opening.

3. The vehicle spreader box assembly of claim 1, wherein the diverter and the opposing sides form a pair of material flow paths to each box floor opening, each path having a converging portion and a non-converging portion.

4. The vehicle spreader box assembly of claim 1, wherein each gate assembly includes a plurality of plates downstream of the gate to vertically channel material exiting each gate.

5. The vehicle spreader box assembly of claim 1, comprising a plurality of pairs of chutes, each pair having a unique configurations to accommodate a particular type of material for spreading.

6. The vehicle spreader box assembly of claim 1, wherein the gate is hydraulically actuated.

7. The method of claim 6, comprising providing at least two chutes of different configurations, and attaching a first chute to the box body at one box floor opening and attaching a second chute to the box body at the other box floor opening.

8. The method of claim 6, comprising providing at least first and second pairs of chutes, the first pair having a first outlet sized to discharge a first material, and the second pair having an outlet sized differently from the first outlet to discharge a second material different from the first material, and attaching either the first chute pair or the second chute pair to the box body depending on the material to be discharged from the box body.

9. The spreader assembly of claim 1, wherein the diverter comprises a pair of angled surfaces, one edge of each surface terminating at the box floor.

10. A spreader vehicle comprising:
   a) an off-road truck having a truck body;
   b) a box body mounted to the off-road truck, the box body having opposing sides, a floor, and a forward wall, the floor further comprising a diverter extending upwardly from the floor to form a pair of material flow paths between the diverter and each opposing side, each material flow path terminating in an opening in the box floor;
   c) a pair of chutes, each chute having an inlet, a converging wall structure forming another material flow path, and an outlet of defined width, each inlet being removably attachable to a respective box floor opening;
   d) a gate assembly mounted to each chute, each gate assembly having a gate sized to cover the chute outlet, the gate being pivotally moveable between a closed position and an open position, opening of the gate allowing material to be discharged from the box body; and
   e) a spreader device mounted to the truck body and positioned beneath each chute outlet for distribution of material in the box body.

11. The spreader vehicle of claim 10, wherein a deflector plate is positioned downstream of each gate.

12. The spreader vehicle of claim 10, wherein the off-road truck comprises a rear tipping mechanism adapted to tip the box body rearward.

13. The spreader vehicle of claim 12, wherein the off-road truck comprises a front tipping mechanism adapted to tip the box body forward, and a pivotal cab guard extending forward of a front end of the box body, the cab guard shielding a cab of the vehicle in the forward tipped position and a horizontal box body position.

14. The spreader vehicle of claim 10, wherein the off-road truck comprises a front tipping mechanism adapted to tip the box body forward, and a pivotal cab guard extending forward of a front end of the box body, the cab guard shielding a cab of the vehicle in the forward tipped position and a horizontal box body position.

15. The vehicle spreader box assembly of claim 10, wherein the diverter and the opposing sides form a pair of converging material flow paths to each box floor opening.

16. The vehicle spreader box assembly of claim 10, wherein the diverter and the opposing sides form a pair of material flow paths to each box floor opening, each path having a converging portion and a non-converging portion.

17. The vehicle spreader box assembly of claim 10, wherein each gate assembly includes a plurality of plates downstream of the gate to vertically channel material exiting each gate.

18. The vehicle spreader box assembly of claim 10, comprising a plurality of pairs of chutes of different configurations, each configuration pair sized to accommodate a different type of material for spreading.

19. The vehicle of claim 10, wherein the diverter comprises a pair of angled surfaces, one edge of each surface terminating at the box floor.

20. A method of spreading material from a spreader vehicle comprising:
   a) providing an off-road truck having a truck body, and further comprising:
      i) a box body mounted to the truck body, the box body having opposing sides, a floor, and a forward wall, the floor further comprising a diverter extending upward from the floor to form a pair of material flow paths between the diverter and each opposing side, each material flow path terminating in an opening in the box floor;
      ii) a pair of chutes, each chute having an inlet, a converging wall structure forming another material flow path, and an outlet of defined width, each inlet being removably attachable to a respective box floor opening;
      iii) a gate assembly mounted to each chute, each gate assembly having a gate sized to cover the chute outlet, the gate being pivotally moveable between a closed position and an open position, opening of the gate allowing material to be discharged from the box body; and
      iv) a spreader device mounted to the truck body and positioned beneath each chute outlet for distribution of material in the box body;
   b) loading material into the box body; and
   c) discharging material onto each spreader device, and distributing the material with the spreader device onto a surface.

21. The method of claim 20, wherein the diverter comprises a pair of angled surfaces, one edge of each surface terminating at the box floor.

* * * * *